(12) United States Patent
Spiers et al.

(10) Patent No.: US 9,100,188 B2
(45) Date of Patent: *Aug. 4, 2015

(54) HARDWARE-BASED ROOT OF TRUST FOR CLOUD ENVIRONMENTS

(75) Inventors: Bradford Thomas Spiers, Bedminster, NJ (US); Miroslav Halas, Charlottesville, VA (US); Richard A. Schimmel, Glenmont, NY (US)

(73) Assignee: Bank of America Corporation, Charlotte, NC (US)

( * ) Notice: Subject to any disclaimer, the term of this patent is extended or adjusted under 35 U.S.C. 154(b) by 652 days.

This patent is subject to a terminal disclaimer.

(21) Appl. No.: 13/422,719

(22) Filed: Mar. 16, 2012

(65) Prior Publication Data

US 2012/0266252 A1    Oct. 18, 2012

Related U.S. Application Data

(60) Provisional application No. 61/492,612, filed on Jun. 2, 2011, provisional application No. 61/476,747, filed on Apr. 18, 2011.

(51) Int. Cl.
*G06F 21/57* (2013.01)
*H04L 9/32* (2006.01)
(Continued)

(52) U.S. Cl.
CPC .......... *H04L 9/3247* (2013.01); *G06F 9/45533* (2013.01); *G06F 21/575* (2013.01); *H04L 9/28* (2013.01); *H04L 9/3234* (2013.01); *H04L 63/0218* (2013.01); *H04L 63/0281* (2013.01); *H04L 63/0428* (2013.01); *H04L 63/08* (2013.01); *H04L 63/0876* (2013.01); *H04L 63/1441* (2013.01); *H04L 67/10* (2013.01)

(58) Field of Classification Search
CPC ............ H04L 63/0428; H04L 63/0876; G05F 9/45533
USPC .................................................. 726/25, 15, 2
See application file for complete search history.

(56) References Cited

U.S. PATENT DOCUMENTS

| 7,146,305 B2 | 12/2006 | van der Made |
| 7,207,039 B2 | 4/2007 | Komarla et al. |

(Continued)

FOREIGN PATENT DOCUMENTS

| CN | 102033755 | 4/2011 |
| EP | 1761837 | 2/2006 |

(Continued)

OTHER PUBLICATIONS

BitVisor: A Thin Hypervisor for Enforcing I/O Device Security, Takahiro Shinagawa, et al., VEE'09, Mar. 11-13, 2009, © 2009, pp. 121-130.

(Continued)

*Primary Examiner* — Ellen Tran
(74) *Attorney, Agent, or Firm* — Banner & Witcoff, Ltd.; Michael A. Springs

(57) ABSTRACT

Apparatuses, computer readable media, methods, and systems are described for generating and communicating a create measured virtual machine (VM) request, the request comprising a network address of a boot server, initiating establishment of a secure tunnel with a measured VM, receiving a quote from the measured VM, and determining, by a processor, whether the measured VM is authentic based on the quote.

24 Claims, 9 Drawing Sheets

(51) Int. Cl.
*H04L 29/06* (2006.01)
*H04L 29/08* (2006.01)
*H04L 9/28* (2006.01)
*G06F 9/455* (2006.01)

(56) References Cited

U.S. PATENT DOCUMENTS

| | | | |
|---|---|---|---|
| 7,805,375 | B2 | 9/2010 | Fox et al. |
| 7,849,462 | B2 | 12/2010 | Traut et al. |
| 7,870,153 | B2 | 1/2011 | Croft et al. |
| 2005/0005096 | A1 | 1/2005 | Miller |
| 2005/0149716 | A1 | 7/2005 | Nair et al. |
| 2005/0251857 | A1 | 11/2005 | Schunter et al. |
| 2006/0155674 | A1 | 7/2006 | Traut et al. |
| 2007/0180448 | A1 | 8/2007 | Low et al. |
| 2008/0046548 | A1 | 2/2008 | Doran et al. |
| 2008/0082680 | A1 | 4/2008 | Grewal et al. |
| 2008/0201414 | A1 | 8/2008 | Amir Husain et al. |
| 2009/0169012 | A1 | 7/2009 | Smith et al. |
| 2009/0204964 | A1 | 8/2009 | Foley et al. |
| 2009/0260007 | A1 | 10/2009 | Beaty et al. |
| 2010/0027552 | A1 | 2/2010 | Hill |
| 2010/0082991 | A1* | 4/2010 | Baldwin et al. .......... 713/176 |
| 2010/0169497 | A1* | 7/2010 | Klimentiev et al. ........ 709/228 |
| 2010/0198972 | A1 | 8/2010 | Umbehocker |
| 2010/0223610 | A1 | 9/2010 | DeHaan et al. |
| 2010/0257523 | A1 | 10/2010 | Frank |
| 2010/0322255 | A1 | 12/2010 | Hao et al. |
| 2011/0099548 | A1 | 4/2011 | Shen et al. |
| 2011/0145821 | A1 | 6/2011 | Philipson et al. |
| 2011/0293097 | A1 | 12/2011 | Maino et al. |
| 2011/0296201 | A1 | 12/2011 | Monclus et al. |
| 2011/0302400 | A1 | 12/2011 | Maino et al. |
| 2011/0302415 | A1 | 12/2011 | Ahmad et al. |
| 2012/0054486 | A1 | 3/2012 | Lakkavalli et al. |
| 2012/0151209 | A1 | 6/2012 | Visnyak et al. |
| 2013/0124600 | A1 | 5/2013 | Jaroker |
| 2013/0290694 | A1 | 10/2013 | Civilini et al. |

FOREIGN PATENT DOCUMENTS

| | | |
|---|---|---|
| JP | 200781014 | 3/2007 |
| WO | 2006011943 A1 | 2/2006 |

OTHER PUBLICATIONS

Patentability Search Report prepared by Mogambo Solutions, Basic Patentability, Transmitting an Operating System Image Template between Computer Systems, Aug. 18, 2011, 9 pages.
Overshadow: A Virtualization-Based Approach to Retrofitting Protection in Commodity Operating Systems, Xiaoxin Chen, et al., ASPLOS'08, Mar. 1-5, 2008, © 2008, 12 pages.
Rapid Trust Establishment for Pervasive Personal Computing, Ajay Surie, et al., Published by the IEEE Computer Society, © 2007, pp. 24-30.
SoftUDC: A Software-Based Data Center for Utility Computing, Mahesh Kallahalla, et al., Published by the IEE Computer Society, © 2004, pp. 38-46.
Subverting Vista™ Kernel for Fun and Profit, Joanna Rutkowska, Advanced Malware Labs, COESEINC, © SyScan'06, Jul. 21, 2006, Singapore and Black Hat Briefings 2006, Aug. 3, 2006, Las Vegas, 52 pages.
Attack, solution and verification for shared authorisation data in TCG TPM, Liqun Chen, et al., HP Labs, UK and University of Birmingham, UK, 2009, 17 pages.
The future of cloud computing—Part 1: Recent history, Terrence Lillard, Sep. 5, 2011, http://www.eetimes.com/General/PrintView/4219629, downloaded Dec. 27, 2011, 6 pages.
The future of cloud computing—Part 2: Current and next phases, Terrence Lillard, Sep. 19, 2011, http://www.eetimes.com/General/PrintView/4227429, downloaded Dec. 27, 2011, 8 pages.
HTTP booting and initramfs assembly, http://etherboot.org/wiki/screenshots, downloaded Jan. 3, 2012, 4 pages.
gPXE Secure Network Booting Project Proposal, http://etherboot.org/wiki/soc/derekpryor-proposal, downloaded Jan. 3, 2012, 1 page.
Etherboot image types, http://etherboot.org/wiki/eb_imagetypes, downloaded Jan. 3, 2012, 6 pages.
A typical network boot scenario, http://etherboot.org/wiki/scenario, downloaded Jan. 3, 2012 1 page.
SafeBootMode, http://etherboot.org/wiki/safebootmode, downloaded Jan. 3, 2012, 2 pages.
Flicker: Minimal TCB Code Execution, Jonathan M. McCune, Carnegie Mellon University, Mar. 27, 2008, 62 pages.
iPXE, http://ipxe.org/start, downloaded Jan. 3, 2012, 2 pages.
PowerPoint, Introduction to Network Booting Free Yourself From Your Hard Drive!, Joshua Oreman, Student Information Processing Board Massachusetts Institute of Technology, Independent Activities Period, Jan. 6, 2010, 27 pages.
TCG PC Client Specific Implementation Specification for Conventional BIOS, Version 1.20 FINAL, Revision 1.00, Jul. 13, 2005 for TPM Family 1.2: Level 2, © 2005 Trusted Computing Group, Incorporated, 119 pages.
Privacy CA, Sample Source Code, printed from http://www.privacyca.com/code.html on Sep. 13, 2011, 4 pages.
Trusted Computing: TCG proposals, Computer Society lecture notes, © 2006, Tien Tuan Anh Dinh et al., updated Nov. 4, 2006, 7 pages.
Trusted Platform on demand (TPod), Hiorshi Maruyama, et al., Feb. 1, 2004, 13 pages.
vTPM: Virtualizing the Trusted Platform Module, Stefan Berger, et al., IBM T.J. Watson Research Center, USENIX Association, Security '06: 15th USENIX Security Symposium, pp. 305-320.
Research and Design of Full Disk Encryption Based on Virtual Machine, Min Ling et al., © 2010 IEEE, pp. 642-646.
Symerton—Using Virtualization to Accelerate Packet Processing, Aaron R. Kunze, et al., ANCS'06, Dec. 3-5, 2006, pp. 133-142.
PowerPoint Symerton—Using Virtualization to Accelerate Packet Processing, Aaron R. Kunze, et al., Communications Technology Lab Corporate Technology Group, Dec. 4, 2006, 21 pages.
iPXE, http://en.wikipedia.org/wiki/IPXE, downloaded Jan. 3, 2012, 2 pages.
NIST Special Publication 800-145, The NIST Definition of Cloud Computing, Recommendations of the National Institute of Standards and Technology, Peter Mell et al., Sep. 2011, 7 pages.
Intel® Trusted Execution Technology: A Primer—Intel® Software Network, Matthew Gillespie, Jun. 1, 2009, 4 pages.
PCT/US2012/033992 International Search Report dated Jun. 27, 2012.
Verizon, "Computing as a Service—Securing our Enterprise Class Cloud" (online), copyright 2010 and dated Nov. 2010, retrieved from the Internet at URL:http://www.verizonbusiness.com/ resources/whitepapers/wp_computing-as-a-service-securing-our-enterprise-class-cloud_en_xg_pdf>.
PCT/US2012/034052 International Search Report dated Jul. 5, 2012.
Siqin Zhao, et al. "The Application of Virtual Machines on System Security," 2009 Fourth ChinaGrid Annual Conference, DOI 10.1109/ChinaGrid 2009.45, Sep. 2009, pp. 222-229.
Notice of Allowance and Fees Due dated Jul. 30, 2014 in U.S. Appl. No. 13/422,732.
Cabuk, et al., "Towards automated security policy enforcement in multi-tenant virtual data centers", 2010, J. Comput. Secur. 18, 1 (Jan. 2010), 89-121.
Jansen, et al., "Policy enforcement and compliance proofs for Xen v virtual machines," In Proceedings of the fourth ACM SIGPLAN/SIGOPS international conference on Virtual execution environments (VEE '08). 2008, ACM, New York, NY, USA, 101-110.
Cabuk, et al., "Towards automated provisioning of w secure virtualized networks". In Proceedings of the 14th ACM conference on Computer and communications security (CCS '07). ACM, New York, NY, USA, 235-245.
Final Office Action dated Aug. 8, 2013 in U.S. Appl. No. 13/422,751.
Non-Final Office Action dated Mar. 19, 2013 in U.S. Appl. No. 13/422,751.

* cited by examiner

HARDWARE-BASED ROOT OF TRUST FOR CLOUD ENVIRONMENTS

CROSS REFERENCE TO RELATED APPLICATIONS

This application claims the benefit of, and priority to, U.S. Provisional Patent Application No. 61/492,612, entitled "Hardware-Based Root of Trust for Multitenant Cloud Environments," filed Jun. 2, 2011, and U.S. Provisional Patent Application No. 61/476,747, entitled "IAAS Cloud Architecture," filed Apr. 18, 2011, the contents of each provisional is incorporated herein by reference in its entirety.

BACKGROUND

Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided.

Cloud computing, however, may present issues with information security and integrity. Use of cloud computing requires trusting the computers that make up the cloud, the network with which the cloud is connected, the individuals and organizations that operate the cloud, and the physical environment in which cloud resources are placed. Trusting these computers in existing clouds, however, is not an acceptable risk for many. In view of such issues, improvements in cloud computing environments are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for providing hardware based root of trust in a cloud environment.

In some aspects. apparatuses, computer readable media, methods, and systems are described for generating and communicating a create measured virtual machine (VM) request, the request comprising a network address of a boot server, initiating establishment of a secure tunnel with a measured VM, receiving a quote from the measured VM, and determining, by a processor, whether the measured VM is authentic based on the quote.

In some aspects, apparatuses, computer readable media, methods, and systems are described for generating a first measurement of a virtualization platform, receiving a create measured virtual machine request comprising authentication information, in response to the request, creating a measured virtual machine based on the authentication information, generating a second measurement of the measured virtual machine, and communicating a quote generated based on the first measurement and the second measurement for attesting to authenticity of the virtualization platform and of the measured virtual machine.

In some aspects, apparatuses, computer readable media, methods, and systems are described for storing a first measurement of a virtualization platform, storing a second measurement of a measured virtual machine, generating a quote using a key, wherein the quote is based on the first measurement and the second measurement, and providing the quote for attesting to authenticity of the virtualization platform and of the measured virtual machine. In a further example, the quote may be generated based on a third measurement of a secure tunnel.

Aspects of the embodiments may be provided in at least one computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
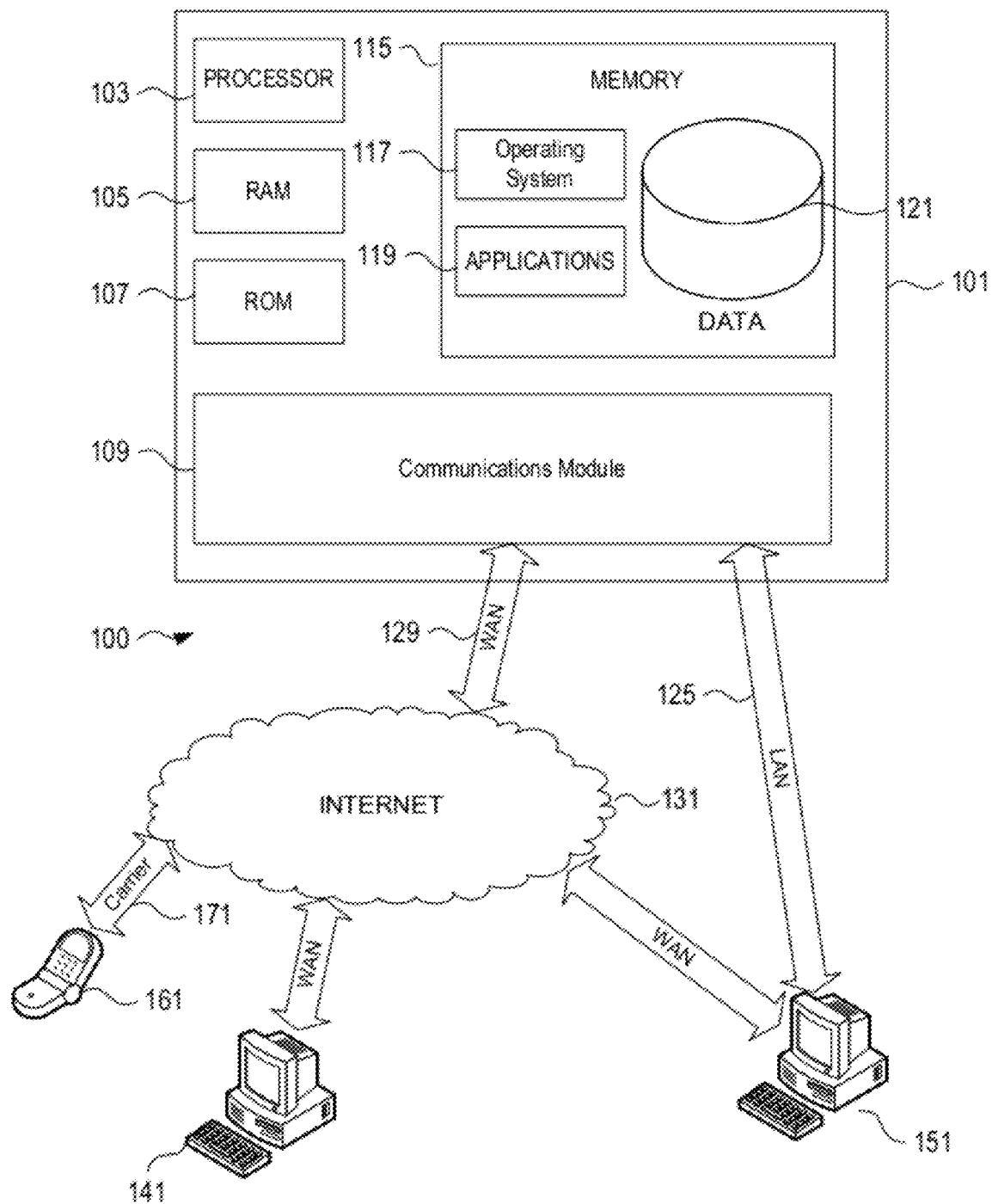
FIG. 1 shows an illustrative operating environment in which various aspects of the present disclosure may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

With reference to FIG. 1, the computing system environment 100 may include a computing device 101 having a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware. Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like to digital files.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device (e.g., smart phone) communicating over wireless carrier channel 171.

The network connections depicted in FIG. 1 may include a local area network (LAN) 125 and a wide area network (WAN) 129, as well as other networks. When used in a LAN networking environment, computing device 101 may be connected to the LAN 825 through a network interface or adapter in the communications module 109. When used in a WAN networking environment, computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
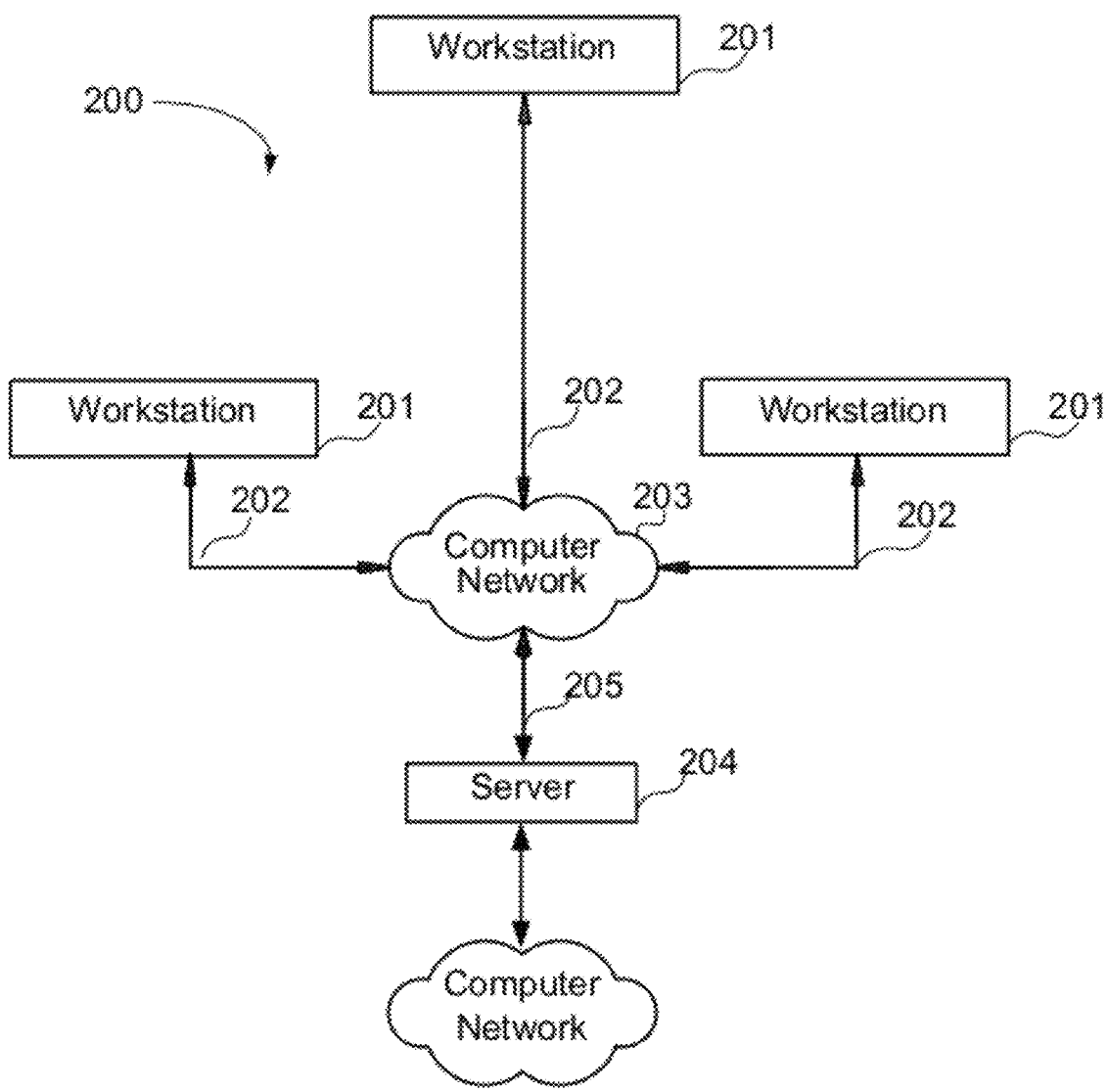
FIG. 2 is an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

The steps that follow in FIGS. 3-6 may be implemented by one or more of the components in FIGS. 1 and 2 and/or other components, including other computing devices.

Figure 3:
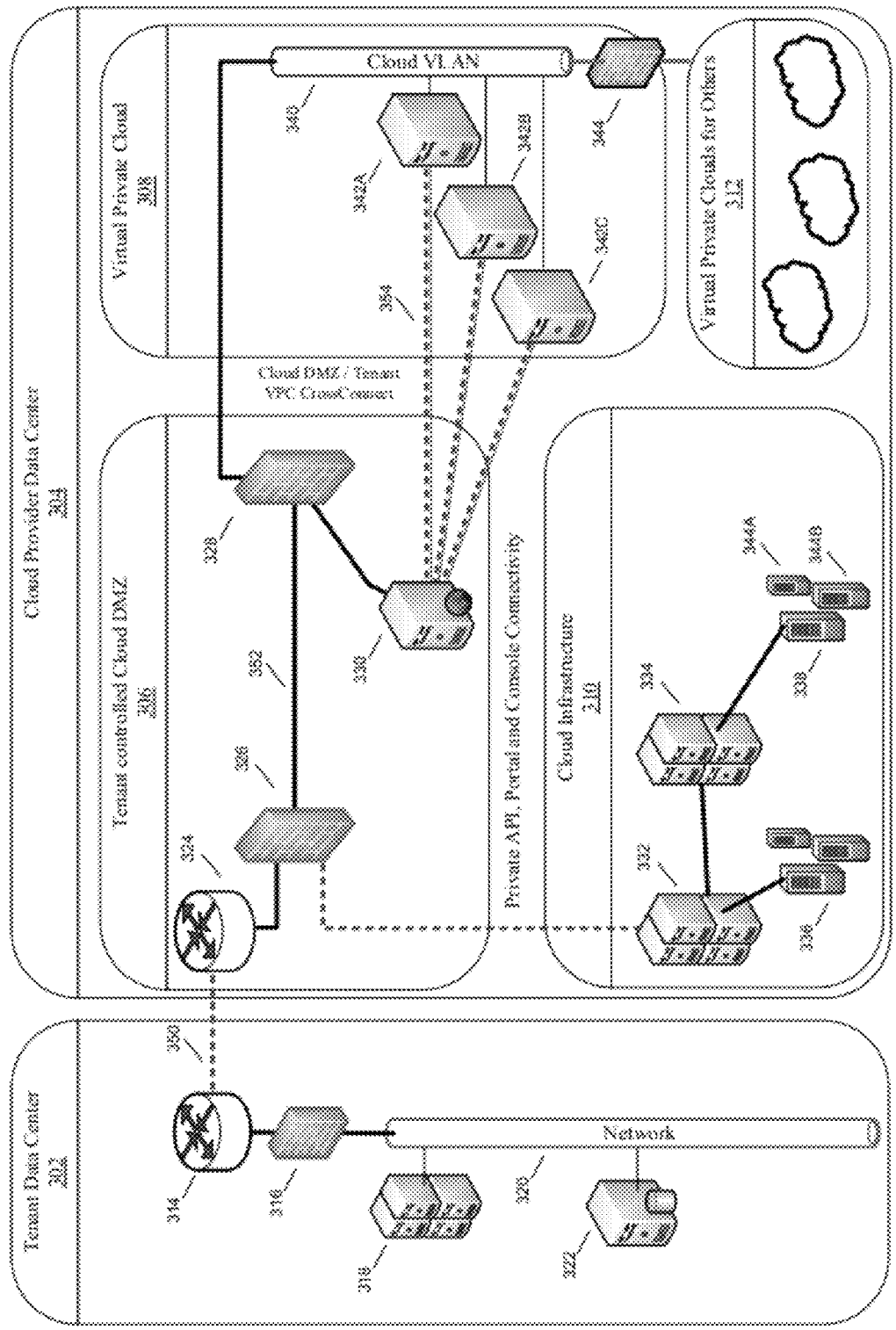
FIGS. 3-5 illustrate example systems for providing hardware-based root of trust in a multitenant cloud environment in accordance with example embodiments.
Figure 4:
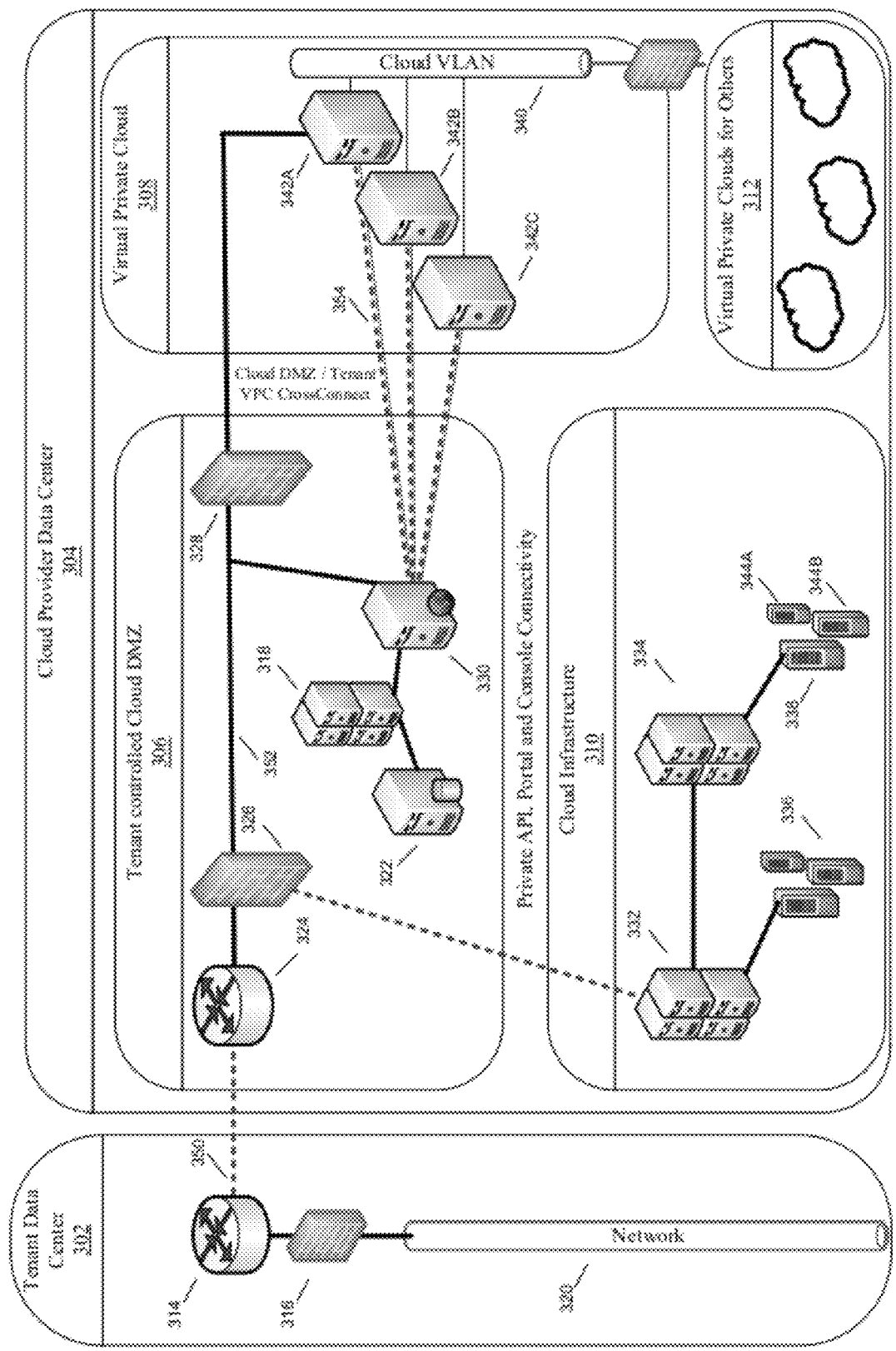
Figure 5:
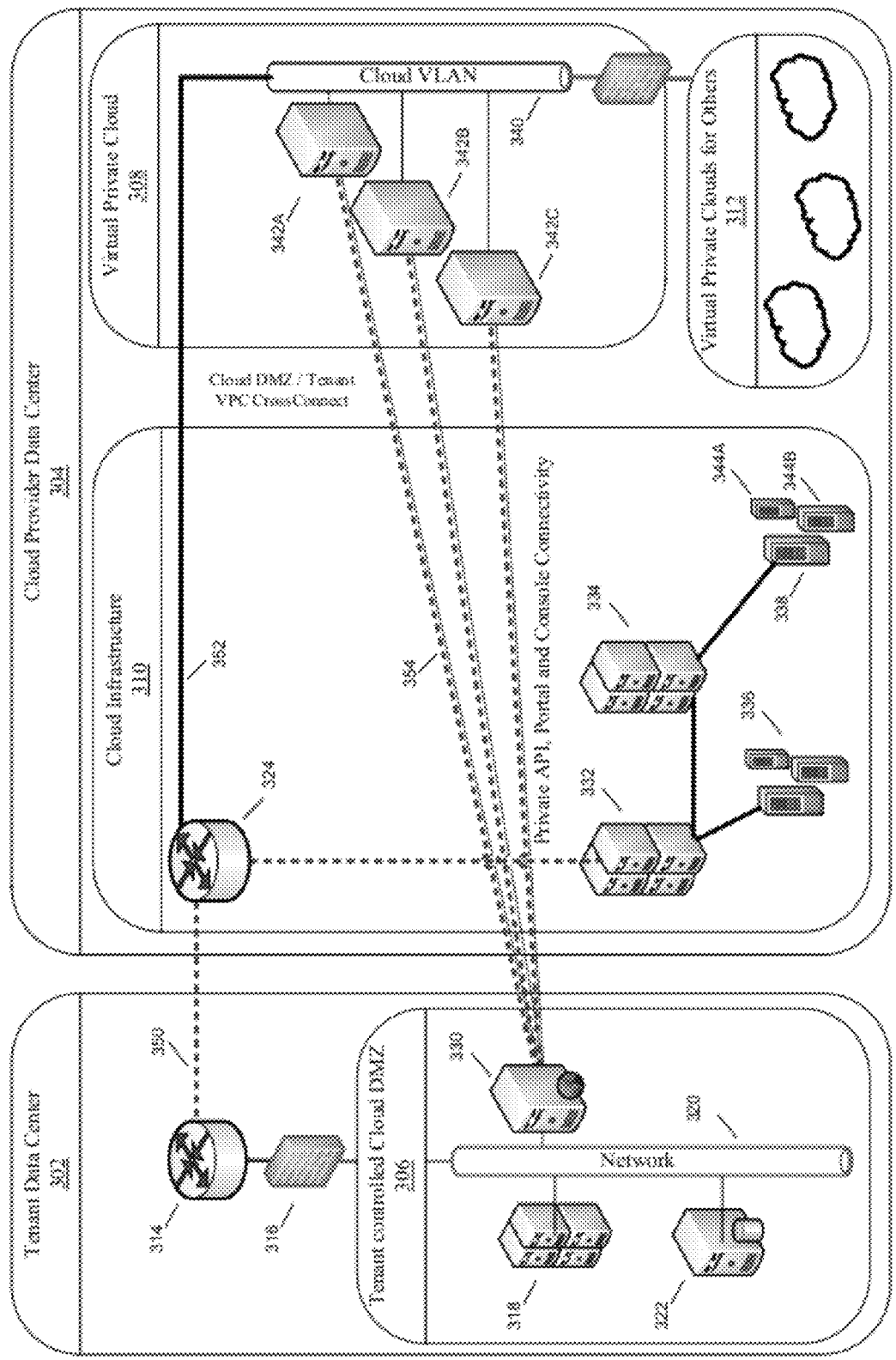

FIGS. 3-5 illustrate example systems providing hardware-based root of trust in a cloud environment in accordance with example embodiments. Hardware-based root of trust may refer to a cloud environment incorporating a trusted piece of hardware within the cloud that a tenant of the cloud may use for remote attestation. Remote attestation may refer to a process of remotely verifying the integrity and authenticity of cloud infrastructure that provides a virtual machine (VM), thereby permitting the tenant to trust the cloud infrastructure. The example embodiments discussed herein may implement a hardware-based remote attestation protocol in a cloud environment, such as shown in FIGS. 3-5. Trust may be established by verifying the integrity and authenticity of software, configurations, and hardware of a virtualization platform that provides a virtual machine on which the tenant may use to execute a workload. The trusted piece of hardware may create cryptographically signed measurements for validating the integrity and authenticity of the hardware, software, and configurations implementing the virtual machine prior to the tenant providing the workload to the virtual machine for execution.

Each of the systems in FIGS. 3-5 may include a tenant data center 302 and a cloud provider data center 304. A cloud provider may be an organization that creates a cloud platform used by one or more tenants to execute computational workloads. A tenant may be a user or an organization that uses the cloud platform to execute its computational workloads. The tenant data center 302 may include computer hardware (e.g., one or more computing devices 101) and software controlled by a tenant. The cloud provider data center 304 may include computer hardware (e.g., one or more computing devices 101) and software controlled by the cloud provider. The cloud provider data center 304 may provide a computational service permitting one or more tenants to execute computational workloads using virtual machines (VMs). A cloud provider may also be one of the tenants.

In an example, a VM may be a software implementation of a computer that executes computer programs as if it were a standalone physical machine. Tenants may initiate creation of VMs within the cloud environment for execution of their workloads. The tenant may request that the cloud environment instantiate a new instance of a VM that may be completely empty without any executable code, in which case the executable code such as, for example, a bootloader may be supplied by the tenant over a network. The bootloader may include instructions informing the VM of how the VM is to operate and may, for example, facilitate loading of an operating system. The bootloader may be the operating system itself, may include a workload, or both. An ordinary VM may not be trusted, but the process described below may permit a tenant to verify integrity and authenticity of a VM, as well as the hardware and software running the VM, prior to forwarding the bootloader and the workload.

Each of the systems shown in FIGS. 3-5 may include a tenant-controlled cloud demilitarized zone (DMZ) 306, which may be part of the cloud provider data center 304 (see FIGS. 3-4) or part of the tenant data center 302 (see FIG. 5), depending on a desired implementation. The tenant-controlled cloud DMZ 306 may be trusted physical space over which the tenant has physical and logical control. This space may include dedicated communication, storage, and computer components used for checking integrity, authenticity, and correctness of the cloud environment, and optimizing operation of cloud nodes. The tenant may use the cloud DMZ 306 as the basis from which to extend trust into the cloud environment.

The tenant data center 302 may include a cloud orchestrator 318 and an internal database 322 coupled to a tenant network 320. The cloud orchestrator 318 may be a combination of hardware, software, and processes that provide automation and ensure authorization and entitlement of an instance of a VM. The cloud orchestrator 318 may also track state and disposition of each VM instance throughout its entire life cycle.

The tenant data center 302 may include a firewall 316 to control communication between tenant network 320 and router 314, and router 314 may communicate with a router 324 of cloud provider data center 304. When tenant-controlled cloud DMZ 306 is included in cloud provider data center 304 (see FIGS. 3-4) and to protect against threats, tenant-controlled cloud DMZ 306 may include an internal firewall 326 and an external firewall 328. The firewalls 326 and 328 may regulate types of data and communications that may enter and leave tenant-controlled cloud DMZ 306. The external firewall 328 may be coupled to a cloud virtual local area network (VLAN) 340.

The VLAN 340 may be dedicated to a single tenant, and all VMs attached to this VLAN may belong to the same tenant. A VM may be considered a "Measured VM" when running in a cloud environment whose authenticity has been verified using the process described herein by remotely attesting to an virtualization platform and hardware on which the VM is running FIG. 3 depicts three Measured VMs 342A-C; however, any number of virtual machines may be used. Virtual private cloud 308 may represent VMs instantiated for a particular tenant. The VLAN 340 may also be connected to virtual provide clouds for other tenants 312. The virtual private clouds for other tenants 312 may represent the VMs instantiated for other tenants. As such, the systems in FIG. 3-5 are multitenant environments as each may instantiate one or more VMs for each tenant.

The router 324 may be coupled to cloud infrastructure 310 at a cloud platform physical infrastructure 336 that provides a cloud platform 332. The cloud infrastructure 310 may include the hardware and software to implement the measured VMs 342. The cloud platform physical infrastructure 336 may be the hardware on which the cloud platform 332 runs. The cloud platform 332 may be software that provides the cloud environment. Cloud platform physical infrastructure 336 may be coupled to virtualization platform physical infrastructure 338 that provides the virtualization platform 334 running the measured VMs 342. Any physical network link (e.g., link created by physical connection, such as network cable or fiber cable) represented by a line between components in FIGS. 3-5 optionally may be encrypted for security measures. For example, links between components depicted in FIGS. 3-5 as dashed lines (e.g., element 350) may represent encrypted links, links between components depicted as solid lines (e.g., element 352) may represent links that may be encrypted or unencrypted, and links between components depicted as including both a dashed line overtop of a solid line (e.g., element 354) may represent virtual encrypted links. A virtual encrypted link may be, for example, a link created by software on top of an encrypted or unencrypted physical link. In other examples, some links described above as being encrypted may be unencrypted.

The systems depicted in FIGS. 4 and 5 have similar components to the system of FIG. 3, but the location of tenant-controlled cloud DMZ 306 differs in each as well as what components are included in the DMZ 306. For example, FIG. 4 depicts cloud orchestrator 318 and internal database 322 being part of tenant-controlled cloud DMZ 306 and included in cloud provider data center 304. FIG. 5, in contrast, depicts tenant-controlled cloud DMZ 306 being located entirely within tenant data center 302. Tenant-controlled cloud DMZ 306 of FIG. 5 includes cloud orchestrator 318, internal database 322, and Secure/Trusted boot server 330. These system configurations, as well as other configurations, may be used to provide hardware-based root of trust in a cloud environment.

It is noted that, in the description provided herein, some operations are attributed to a certain device, component, software, and the like. It is within the scope of the example embodiments that operations performed by one element may be performed by another element. Further, multiple elements may be combined into a single apparatus that performs the operations of the different elements, and operations described as being performed by a single element may be performed by multiple subelements.

An issue with using conventional cloud environments is that a tenant may not trust the cloud infrastructure 310 that provides the cloud environment, nor the virtual environment it provides. To permit attestation of integrity and authenticity of the hardware and software running a VM, the cloud provider may incorporate a trusted protection module (TPM) 344 into each virtualization platform physical infrastructure 338 so that the hardware and software running the VMs, as well as a configuration of the VMs, can be confirmed by the tenant to be reliable. For example, the infrastructure 338 may be a collection of servers, and each server may include at least one TPM 344.

TPM technology was conventionally designed to be anonymous and to protect the privacy of the TPM owner. TPM keys and TPM quotes were not uniquely tied to an individual piece of hardware. In the example embodiments, rather than providing privacy, tenants may determine which piece of TPM hardware has a particular key and produced a particular TPM quote. Since TPM technology prevents creating such an association in an automated fashion, the cloud provider may be responsible for creation and correctness of an association between a particular TPM and a TPM quote. This responsibility could be further enforced by binding legal agreements between tenant and cloud provider.

In an example, the cloud provider may create and maintain a trusted and verifiable inventory of valid attestation identity keys (AIK). AIKs may be a public/private key pair. The inventory may identify which public key is associated with which TPM. The inventory may also identify which physical infrastructure 338 contains a particular TPM 344 having a particular AIK public key. The cloud provider may provide each tenant with the inventory using a trusted verifiable process so that the tenant is aware of valid public keys (e.g., AIK, TPM transport session key), and which TPM corresponds to a particular physical infrastructure 338. For example, the tenant may store the key inventory in internal database 233.

To permit a tenant to confirm the authenticity of the key inventory, the cloud provider may sign the inventory using a cloud provider private key which any tenant may verify by confirming the signature using a cloud provider public key. Also, a cryptographic hash of the current inventory, for example, may be made available in other manners (e.g., on a cloud provider website or over the phone with appropriate cloud provider personnel). The cloud provider may also support a method to verify authenticity of the AIK public keys using, for example, Privacy CA (PrivacyCA) or Direct Anonymous Attestation (DAA) Protocol. The tenant may use such a method to validate received AIK public keys to ensure that these are in fact generated by a particular TPM 344.

The cloud provider may update the inventory every time new physical infrastructure 338 containing a TPM is added or removed from the cloud infrastructure 310. At that time, the cloud provider may provide to the tenant an updated key inventory with an updated list of keys. The keys may by audited by physically interrogating a specific physical infrastructure 338 (e.g., by booting the physical infrastructure 338 from trusted media and querying the TPM 344 directly to verify the keys in the inventory associated with the physical infrastructure 338). The tenant may store validated keys, as well as keys which fail validation, in internal database 322 for use during a process of remote attestation of a Measured VM 342.

At this point, the tenant may trust two things: first, what the tenant has physical and logical control over (e.g., the cloud DMZ 306, tenant data center 302); and second, TPMs 344 and computer chips within the cloud environment incorporating core root of trust measurement (CRTM) technology. TPMs 344 may be trusted as they may be provided by trusted vendors and the authenticity of the keys of the TPM 344 has been verified and audited by the cloud provider. Active Management Technology (AMT), for example, may be used as a CRTM for TXT architecture. Since the tenant is remote from a TPM, the attestation of the integrity and authenticity of the cloud infrastructure 310 has to be performed remotely, and is thus referred to as remote attestation. Conventional TPMs may provide support for remote attestation, such as a TPM transport session, but this support might not be complete and might not address all possible threats, such as, for example, MiM attack and Relay/Masquerading attack. The example embodiments provide for establishing a secure channel between tenant data center 302 and a TPM 344 to perform remote attestation while protecting against these, and other, types of attacks. The following describes a remote attestation process for establishing, using a TPM 344, trust across a cloud environment between the tenant data center 302 and the cloud infrastructure 310.

Figure 6:
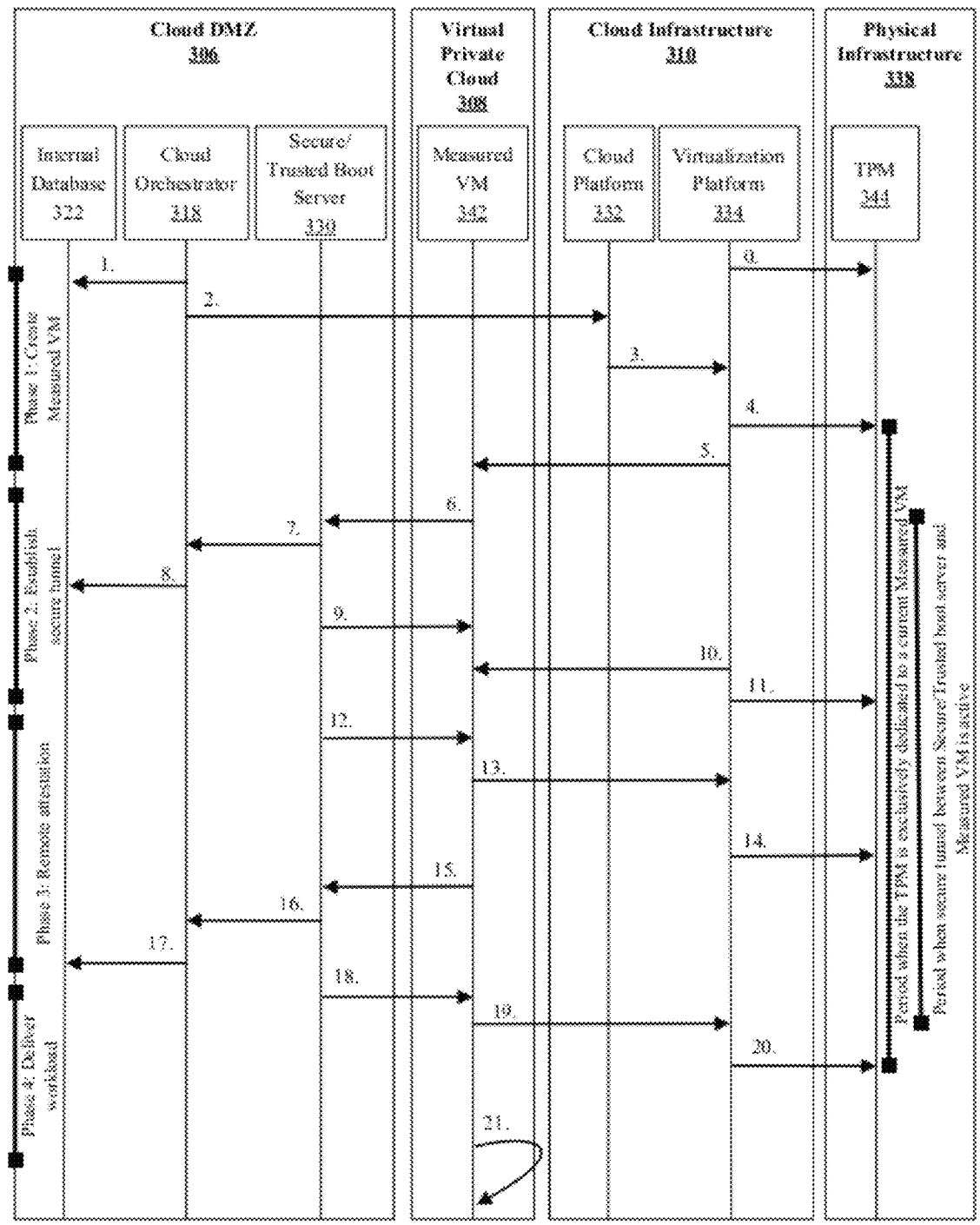
FIG. 6 illustrates an example flow diagram of communications between a Cloud DMZ, cloud virtualization platform and a trusted protected module (TPM) for performing remote attestation of integrity and authenticity of a cloud computing environment, in accordance with example embodiments.

FIG. 6 illustrates an example flow diagram of communications between cloud DMZ 306, cloud infrastructure 310, and physical infrastructure 338 to perform remote attestation of integrity and authenticity of a VM, in accordance with example embodiments. In one example, the flow diagram proceeds through 4 phases. In a first phase, a measured VM is created. In a second phase, a secure tunnel is established between the Secure/Trusted server 330 and the Measured VM 342. In a third phase, remote attestation of the measured VM occurs. In a fourth phase, a workload is delivered to the Measured VM for execution.

Phase 1: Creating a Measured VM

With reference to element 0 of FIG. 6, prior to instantiating a new measured VM 342, the TPM 344 may store measurements of some or all binaries, configuration settings, and/or other related information of the virtualization platform 334, and store these values within platform configuration registers (PCR) registers of the TPM 344. In an example, a TPM 344 may be a specialized hardware chip that is designed to hold keys, perform cryptographic and attestation operations, and is tamper evident (e.g., if the TPM is tampered with, the TPM will allow detection of such tampering). For example, the TPM may conform to specifications of the TRUSTED COMPUTING GROUP™ (TCG).

In an example, TPM 344 may store attestation identity keys (AIKs). AIKs may be a public/private key pair that may be used during an attestation process in which the TPM 344 provides a TPM quote that is a function of the stored measurement values and the private key. The private key may be stored by the TPM 344 and kept unrevealed, in some examples. The private key may be unique to the TPM 344, and the TPM 344 may store one or more public/private key pairs. The public key may be publicly available and used to decrypt the TPM quote to confirm that the TPM is the device that actually created the quote. Because the private key is unique to the TPM 344, the tenant knows that only TPM 344, and not some other device, could have created the TPM quote. Public and private keys stored by the TPM 344 may be trusted as the authenticity of these keys may have been verified, for example, using Privacy Certification Authority (PrivacyCA) or Direct Anonymous Attestation (DAA) protocol.

The physical infrastructure 338 may incorporate Dynamic Root of Trust Measurement (DRTM) technology to work with the TPM 344. The DRTM technology may be implemented by a central processing unit (CPU) and chipset of the physical infrastructure 338. Examples of CRT technology are known in the art, such as the TXT technology. DRTM technology may provide protection and support for secure computing. DRTM technology may include extensions to microprocessors and chipsets for establishing hardware-based trust and control in a cloud environment. DRTM technology may measure various environment elements without the need to restart hardware of the TPM 344 and also may provide protection against unauthorized access to memory of the physical infrastructure 338 that implements DRTM technology.

The TPM 344 may store measurements of some or every software element participating in a startup process for a measured VM (e.g., including but not limited to CPU, Firmware, Basic Input/Output System (BIOS), BIOS Option Modules, bootloader, virtualization platform, loadable modules, configuration information, and the like), hardware that makes up the physical infrastructure 338, and software and configuration information of the virtualization platform 334. In an example, a measurement may be of at least one of a configuration parameter (e.g., software version, hardware, and the like) of a device or software, or of a configuration that the tenant may wish to authenticate prior to communicating with the device. The measurement may also be of a binary code (e.g., CPU microcode, firmware, BIOS, bootloader, operating system component, virtualization platform component, device driver, application, and the like) that the tenant may wish to authenticate. For example, the tenant may wish to confirm that a device is running a particular software version using a particular piece of hardware.

In an example, a measurement may be a cryptographic hash (e.g., using a secure hash algorithm (SHA)) of one or more of a binary BIOS code, firmware of each device in the physical infrastructure 338, bootloader, each binary module of the virtualization platform 334 including virtual BIOS and device firmware of the virtual machines created by this virtualization platform, and the like. Example requirements of measurements for a PC platform are defined by "TCG PC Client Specific Implementation Specification For Conventional BIOS, Version 1.20 Final, Jul. 13, 2005, For TPM Family 1.2; Level 2," the contents of which are incorporated herein by reference in its entirety. The measurements stored within TPM as part of element 0 of FIG. 6 may be tenant-independent, and therefore may apply to all tenants that use the virtualization platform 334.

In an example, physical infrastructure 338 may include a code segment that is trusted, and in which trust in other code segments may be established. The trusted code segment may be hard coded into the processor, for example. The processor (e.g., processor 103) may execute the trusted code segment to measure a first initially untrusted code segment to verify its integrity and pass the measurement value to the TPM 344 for storage. TPM 344 may add the measurement value to a value stored in the PCR register. The measurement may be information (e.g., a cryptographic hash) that may uniquely describe another piece of information (e.g., a segment of binary code or data). The TPM 344 may combine the measurement value with an existing value stored by a PCR register to prevent spoofing of specific values.

Once integrity of the first initially untrusted code segment is confirmed, that code segment may be considered trusted. Control may be passed to the newly trusted code segment for measuring a second initially untrusted code segment and storing that measurement value in the TPM 344. Once integrity of the first initially untrusted code segment is confirmed, that code segment may be considered trusted and control may be passed to the second newly trusted code segment. This code segment by code segment process of making and storing measurement values may establish a chain of trust back to the trusted code segment to confirm integrity and authenticity of a desired number of code segments. As such, root of trust may move from one segment of computer code to a next segment of code stored within the physical infrastructure 338 when making measurements on each code segment.

In a more detailed example, BIOS boot code of the physical infrastructure 338 may be a code segment that is trusted. The processor 103 may execute the BIOS boot code segment to make a measurement of a next code segment (e.g., bootloader), and then store the measurement value of bootloader code segment in the TPM 344. The BIOS boot code segment may pass control to the bootloader code segment. The processor 103 may execute the bootloader code segment to make a measurement of a next code segment (e.g., operating system), and store the measurement value of the operating system code segment in the TPM 344. This process may continue until a desired number of code segments have been measured and measurement values stored in the TPM 344. In an example, a CRTM is established. The CRTM is measured and the measurement is stored in the TPM 344 for a next software element in the stack (e.g., BIOS), which does the same for the next element (e.g., bootloader) and so on until the measurements for the elements of the virtualization platforms are established and stored in the TPM 344. Physical infrastructure 338 may similarly measure the virtual platform 334 and a VM.

With reference to element 1 in FIG. 6, when the tenant desires to have a Measured VM created, cloud orchestrator 318 may create and store, within a data store (e.g., internal database 322), a reservation R with unique authentication code U and specific networking settings including a virtual internet protocol (VIP) address I. The cloud provider may assign the VIP address I as the network address for a newly created VM. The Secure/Trusted boot server 330 may subsequently expect to receive a request to download a bootloader from VIP address I. The authentication code U may serve as a nonce for associating a request to create a Measured VM with a request that the Measured VM later sends to the tenant's Secure/Trusted boot server 330 to download the bootloader. A nonce may be an arbitrary number (for example, used only once to prevent replay attacks) that may be used by the TPM 344 to generate a TPM quote. The authentication code U may be used to confirm that cloud orchestrator 318 was the device that sent the create Measured VM request, and not some other device.

With reference to element 2, cloud orchestrator 318 may send a create Measured VM request to an application programming interface (API) of cloud platform 332. The request may include the networking settings (e.g., VIP address I), the unique authentication code U, tenant-specified configurations, as well as any additional details required by the cloud provider to create the virtual machine, such as VM configuration (e.g., VM size, disk size, and the like).

With reference to element 3, cloud platform 332 may forward the request to the virtualization platform 334. For example, cloud platform 332 may invoke a software application programming interface (API) instructing the virtualization platform 334 to instantiate a measured VM based on at least one of the provided network settings (e.g., a VIP address I), authentication code U, and VM configuration, tenant-specified configurations, additional details from the cloud provider, and the like.

With reference to element 4, the virtualization platform 334 may be dedicated to a single Measured VM 342, and hence may perform remote attestation for one Measured VM 342 at a time. The virtualization platform 334 might not allow any other measured VM or software to use the TPM 344, while the TPM 344 is being used for remote attestation of the current Measured VM. In some examples, the TPM 344 may not be virtualized. For the current Measured VM, the TPM 344 may store measured binaries (e.g., VM specific firmware, BIOS, and loadable modules) and a configuration of the Measured VM 342, in a set of PCR registers dedicated for VM measurements.

For example, the virtualization platform 334 may reserve (1-n) PCR registers in the TPM 344 for storing measurements of the configuration of the Measured VM 342. The measurements may include a certificate authority of the Secure/Trusted boot server 330 from which the Measured VM 342 is to boot as well as a network address (e.g., VIP address I, a uniform resource locator (URL), and the like) of the boot server 330. At least some of the measurements may be tenant-specific since they may include configuration information specified by the tenant. From this point until a secure boot sequence for the Measured VM 342 is completed or aborted, the TPM 344 may be dedicated to this Measured VM and the TPM 344 may be queried by the tenant that requested instantiation of the Measured VM. The TPM 344 may release the PCR registers when the Measured VM completes a secure/trusted boot sequence and receives a bootloader from a configured Secure/Trusted boot server 330, or when the boot sequence fails, as described in further detail below.

To ensure that environment issues such as network connectivity, incorrectly configured Measured VM, or incorrectly behaving Secure/Trusted boot server 330 cannot block creation of Measured VMs indefinitely, the virtualization platform 334 configuration may specify a time threshold within which a Measured VM 342 may be required to complete an attestation sequence and receive its bootloader. If the Measured VM 342 doesn't receive the bootloader in the allotted time, the virtualization platform 334 may destroy the Measured VM 342.

With reference to element 5, the virtualization platform 334 may create and initialize an instance of a Measured VM with VIP address I and authentication code U. Upon creation, the Measured VM 342 may be an empty shell, without any software or operating system. The Measured VM 342 may also contain a fully encrypted operating system or other software which cannot be executed until it is unlocked/decrypted by the tenant by providing an appropriate key or decrypting software, once the integrity and authenticity of the Measured VM has been confirmed.

Phase 2: Establishing a Secure Tunnel

With reference to element 6, a basic input/output system (BIOS) of the Measured VM 342 may initiate a preboot execution environment (PXE) networking stack using networking settings, including VIP address I, specified by the virtualization platform 334 during creation of the Measured VM 342. Also, the PXE networking stack may dynamically obtain a network address, instead of or in addition to Virtual IP address I, using dynamic host configuration protocol (DHCP) protocol. The PXE may be an environment and process for booting computers of virtual machines using a boot loader and/or an entire operating system received from the tenant over a network.

Upon initiation, the BIOS may start a PXE boot sequence by sending a PXE boot request to the Secure/Trusted boot server 330 specified by the virtualization platform 334. The boot server 330 may be configured to remotely attest to the authenticity of a Measured VM and to upload a workload to the Measured VM if authentic. As noted above, remote attestation may refer to a process of remotely verifying the integrity and authenticity of the virtualization platform 334 and the infrastructure 338 on which the platform 334 is running, as well as the integrity and authenticity of the Measured VM 342. Measured VM 342 may include the unique authentication code U specified by the virtualization platform 334 in the PXE boot request. The PXE boot request may be considered as an initial request of a handshake to establish a secure tunnel (e.g., using a transport layer security (TLS) protocol) between the Measured VM 342 and the Secure/Trusted boot server 330.

With reference to element 7, upon receiving the PXE boot request, the boot server 330 may query the cloud orchestrator 318 for a reservation R corresponding to information provided in the PXE boot request in an attempt to associate the PXE boot request with the original request to create the Measured VM sent by the cloud orchestrator 318, described above in elements 1-2.

With reference to element 8, cloud orchestrator 318 may attempt to extract at least one of the VIP address I, unique authentication code U, or any other identifiers from the PXE boot request, and use this information for querying the internal database 322 to determine if there is a reservation R having matching information. If a reservation R having matching information cannot be located, cloud orchestrator 318 may deny the boot request and instruct the virtualization platform 334 to terminate the Measured VM 342. For instance, if the VIP address I or the authentication code U are incorrect and/or there is no such reservation in the internal database 322, the boot request may fail. If a matching reservation is located, cloud orchestrator 318 may pass the reservation R to the Secure/Trusted boot server 330 to continue establishment of the secure tunnel.

As such, attempting to match a unique authentication code U, specific VIP address I and/or other information from the original reservation R to create the Measured VM with information extracted from the PXE boot request permits cloud orchestrator 318 to authenticate each PXE boot request, and therefore protect against low effort attacks, such as accidentally or intentionally starting a measured VM in the cloud without a corresponding reservation.

With reference to element 9, upon being informed that a matching reservation R has been found, Secure/Trusted boot server 330 may complete the handshake to establish the secure tunnel (e.g., using transport layer security (TLS) protocol) with the Measured VM 342. As part of the handshake, Secure/Trusted boot server 330 may send to the Measured VM 342 a certificate signed by a specific certificate authority (CA) of the tenant. Upon receipt, the Measured VM 342 may verify that the certificate provided by the Secure/Trusted boot server 330 matches the constraints of its configuration information as specified by the virtualization platform 334. An example constraint may be that a certificate provided by the Secure/Trusted boot server 330 was signed by a Certificate Authority. If the certificate is acceptable, Secure/Trusted boot server 330 and the Measured VM 342 may agree on a session key that will be used to encrypt traffic over the secure tunnel. From this point forward, any communication between the Secure/Trusted boot server 330 and Measured VM 342 may be conducted using encrypted communications sent via the secure tunnel. Also, there may be additional layers of encryption to secure this tunnel. The encryption scheme described above is just one example, and does not limit use of other layers.

Advantageously, the secure tunnel may protect against a Man in the Middle (MiM) attack on any future communications between the Secure/Trusted boot server 330 and Measured VM 342. A MiM attack is an attack in which an intruder eavesdrops on and/or tampers with communications between two parties. Rather than communicating with each other directly, each of the two parties unknowingly communicates with the intruder, which controls the connections and relays messages between the communicating parties.

The secure tunnel, by itself, may not guarantee that the Measured VM 342 is authentic (e.g., that the measured VM is running on a virtualization platform 334 that is authentic, not tampered with and backed by a TPM 344). Cloud orchestrator 318 and/or Secure/Trusted boot server 330 may not send a workload to the Measured VM 342 for execution until after attesting to its authenticity. To do so, cloud orchestrator 318 and/or Secure/Trusted boot server 330 may confirm that code of an authentic not-tampered Measured VM BIOS function operates in an expected manner and may allow TLS connections with servers having a certificate issued by particular certificate authority (CA) as specified in configuration information of the virtualization platform 334.

With reference to element 10, once the virtualization platform 334 notices (or is notified) that a secure tunnel has been established between Measured VM 342 and Secure/Trusted boot server 330, virtualization platform 334 may retrieve from the Measured VM 342 a measurement of a secure tunnel session. For example, the Measured VM 342 may make a measurement of a TLS session key that can be provided to the virtualization platform 334. The process of how a session key is derived and agreed upon may depend on a specific protocol used to establish the secure channel. For example, the TLS protocol describes how a session key may be derived.

Rather than letting the Measured VM 342 call an exposed API of the underlying virtualization platform 334 to provide the secure tunnel session measurement, the virtualization platform 334 may access a known memory location of the Measured VM 342 upon detecting that the secure tunnel has been established to obtain the measurement. The Measured VM 342 may also notify the virtualization platform 334 that the secure tunnel has been established (e.g., so that virtualization platform doesn't have to monitor all received traffic) and the virtualization platform 334 may then retrieve the secure tunnel session measurement from the Measured VM 342 (e.g., rather than the Measured VM pushing the measurement to the virtualization platform 334).

With reference to element 11, the virtualization platform 334 and the infrastructure 338 may then update one or more PCR registers within the TPM 344 with the secure tunnel session measurement (e.g., measurement for a TLS session key used to encrypt the traffic within the secure tunnel). Below is an example of updating a PCR register.

p:=TPM_PCR_Reset(p);
p:=TPM_Extend(p, Measurement(Secret_Key_for_Existing_TLS_Session))

By including the secure tunnel session measurement in the TPM 344, the endpoint of the secure tunnel may be tied to the virtualization platform 334 and the infrastructure 338 on which the platform 334 runs. The virtualization platform 334 may be measured and therefore may be verified to be authentic. An authentic virtualization platform 334 may be configured, in one example, to only allow a Measured VM 342 locally launched by the platform 334 to provide the secure tunnel session measurement established with the Secure/Trusted boot server 330. An authentic virtualization platform 334 might not allow some remote entity (e.g., other software, remote VM, remote hypervisor) to interact with its hypervisor, which may manage the Measured VM. An authentic virtualization platform 334 may only allow a Measured VM locally created on the physical infrastructure 338 to use APIs of the hypervisor to work with the TPM 344 on the physical infrastructure 338. In other words, the hypervisor attestation/TPM related API may be local only and might not be used remotely.

Phase 3: Remote Attestation

At this point, the established secure tunnel may not extend all the way to the TPM 344. Instead, the network communication endpoint may be the BIOS of the Measured VM 342, which is part of the virtualization platform 334 that runs on top of the virtualization platform physical infrastructure 338 containing the TPM 344. For the TPM 344 to attest the authenticity and integrity of the Measured VM 342 and further protect communication between the tenant and the TPM 344, communication may be established between the cloud DMZ 306 all the way to the TPM 344.

To do so, a TPM transport session may be established and used as an information exchange mechanism to allow software running in the cloud DMZ 306 to specify requests in such a way that only a specific TPM 344 may execute them. Such requests may be encrypted using a shared secret established using a private key in the TPM 344 and a public key of the cloud DMZ 306. The boot server 330 may initiate establishment of a TPM transport session by sending an encrypted request to the Measured VM 342 using the secure tunnel.

With reference to element 12, the Secure/Trusted boot server 330 may establish a TPM transport session via the established secure tunnel and send a remote attestation request to the Measured VM 342. This request may be used to verify the authenticity of the virtualization platform 334 on which the Measured VM 342 is running, including some or all binaries, configuration settings and other software, hardware or configuration elements that are used to run the Measured VM. The remote attestation may be executed by sending a request to the Measured VM 342 to retrieve a TPM quote accompanied by a randomly generated nonce N. In an example, the authentication code U from reservation R may serve as the nonce. The TPM quote may incorporate the nonce N to protect against replay attacks. To further increase the security, the TPM quote request may be performed within the TPM transport session bound to a TPM 344 incorporated into the underlying infrastructure 338.

In an example, the TPM 344 may encrypt data sent via the TPM transport session using a TPM bound key. The TPM bound key may be tied to the AIK key of the TPM 344 (e.g., by nature of this encryption key being generated and certified by the AIK key). The TPM bound key may be specified by the cloud provider and included in the TPM inventory stored in the internal database 322. In another example, migration keys may be used to encrypt data of the TPM transport session. Migration keys, for example, may be generated by the tenant and then migrated and loaded to the TPM dedicated to the Measured VM. A migration key may be a key migrated from the tenant to the TPM 344 using features provided by TPM 344. An example process of key migration is described in the "TCG PC Client Specific Implementation Specification For Conventional BIOS, Version 1.20 Final, Jul. 13, 2005, For TPM Family 1.2; Level 2," referenced above. Key migration may allow use of tenant provided keys to encrypt the TPM transport session, rather than using key generated by a vendor, cloud provider or some other entity. The TPM Bound key or migration key may be used to establish a TPM transport session between the tenant and TPM 344 to encrypt the communication to retrieve the TPM quote.

With reference to element 13, the Measured VM 342 may locally forward requests to establish the TPM transport session and any request received in the session to the virtualization platform 334. Locally forwarding may refer to forwarding by means other than network communication so that the request is executed on the same host on which it was forwarded. Examples of local forwarding may include using interprocess communication, shared memory, interrupt, and the like. In an example, the Measured VM 342 may locally send a request to the virtualization platform 334 requesting a TPM quote for verifying the integrity and authenticity of the virtualization platform 334, the Measured VM 342, and the infrastructure 338. An authentic not-tampered with virtualization platform 334 may accept such requests only from the Measured VM 342 which was created on the virtualization platform 334 and to which the TPM 344 is currently dedicated. The virtualization platform 334 may send the request directly to the TPM 344, and only the TPM to which the request was directed may execute the request.

An authentic, non-tampered with, virtualization platform may guarantee that, only the VM that it created and is therefore local, can issue such request. Such a virtualization platform may prevent any other VM or other software running on the same or other computer, to issue such request to protect against Relay/Masquerading attacks. If other software or non-local VM could issue such request, it would be potentially possible that some remote piece of software pretending to be an authentic virtualization platform would retrieve the TPM quote and then forward it to the tenant as if the quote was produced on the platform running this malicious software.

With reference to element 14, the TPM 344 may produce a TPM quote using at least some of the measurements stored in its PCR registers. The TPM quote may uniquely attest to the authenticity and integrity of one or more of the virtualization platform 334, the configuration of platform 334, underlying software and hardware elements of platform 334, the Measured VM 342, configuration and any related binary elements of the Measured VM 342, the established secure tunnel, and the like. The TPM quote may also be based on nonce N. As noted above, the nonce may be a random number and the authentication code U generated by the tenant may serve as the nonce.

In an example, the TPM 344 may create the TPM quote as a function of a nonce, a set of one or more of the measurement values (e.g., software version, binary code, configuration information, hardware type, and the like) stored in the PCR registers, and the private key. The TPM 344 may combine the set of one or more stored measurements with the nonce, and then cryptographically sign the result of the combination with the private attestation identity private key (AIKpriv) to produce the TPM quote.

In a more detailed example, the TPM 344 may produce the TPM quote based on one or more core root of trust measurements (CRTM), BIOS (e.g., option ROMs, firmware), boot loader, virtualization platform 334 including any loadable or third party modules, VM BIOS (e.g., option ROMs, firmware), configuration files, measurements of configurations specific to the Measured VM 342, including, for example, the certificate/certificate authority and network address (e.g., URL) of the Secure/Trusted boot server 330, and a measurement of the secure tunnel (e.g., TLS session key) established between the Measured VM 342 and the Secure/Trusted boot server 330. If a TPM transport session is used, the Measured VM 342 may forward the local request to the virtualization platform 334 for encrypting the TPM quote using the TPM session key. The TPM 344 may also digitally sign the quote and nonce using its private attestation identity key (AIKpriv).

With reference to element 15, the Measured VM 342 may then forward, to the boot server 330 via the secure tunnel, the TPM quote and the public attestation identity key (AIKpub) corresponding to AIKpriv of the TPM 344 used to sign the quote.

With reference to element 16, Secure Trusted boot server 330 may forward the received TPM quote to cloud orchestrator 318 for authentication.

With reference to element 17, cloud orchestrator 318 may retrieve expected measurements from the internal database 322 as well as expected AIKpub of the TPM 344. Cloud orchestrator 318 may verify that the received AIKpub matches expected AIKpub stored in the internal database 322. As noted above, the cloud provider may identify an expected AIKpub for the TPM 344 as part of the key inventory stored in the internal database 322. Expected AIKpub may be, for example, pre-validated to ensure this key is TPM backed using standard processes to verify authenticity of AIKpub (e.g., using PrivacyCA, DAA, and the like).

After verifying that received AIKpub matches expected AIKpub, cloud orchestrator 318 may decrypt the TPM quote using AIKpub of the TPM 344 to obtain the set of one or more measurements combined with the nonce (e.g., authentication code U). Because the cloud orchestrator 318 knows the nonce, cloud orchestrator 318 may remove the nonce to obtain the set of one or more measurements. Cloud orchestrator 318 may then compare expected values for the set of one or more measurements with the values derived from the TPM quote. If the AIKpub, nonce and measurements match, cloud orchestrator 318 may deem the Measured VM 342, the virtualization platform 334, and the infrastructure 338 on which the platform 334 is running to be authentic, not tampered with, and configured as expected, and may indicate that a workload may be delivered from the tenant to the Measured VM 342 using the established secure tunnel. If mismatch is detected, cloud orchestrator 318 may abort the boot request and request the virtualization platform 334 to terminate the measured VM 342.

Cloud orchestrator 318 may deem the Measured VM 342, the virtualization platform 334, and the infrastructure 338 to be authentic because the Measured VM 342 may not communicate with anybody else but tenant's Secure/Trusted boot server 330, as proven by the measurements. Further, Secure/Trusted boot server 330 may ensure that there is only one secure tunnel per VIP address I, authentication code U, reservation R, and secure tunnel measurement (e.g., measurement of TLS session key). Moreover, a signed measurement of the secure tunnel is part of the TPM quote received from the Measured VM 342, which means the Measured VM 342 runs on a TPM 344 that produced that signature, as there may not be a way to inject the value of the secret key (e.g., TLS session key) for the TLS session into an authentic TPM running and authentic platform. As the last step of the PXE boot sequence, the boot server 330 may deliver the tenant's bootloader and workload to the verified Measured VM 342 using the established secure tunnel.

Phase 4: Delivery of Workload

With reference to element 18, once the Measured VM 342 is deemed to be authentic, the Secure/Trusted boot server 330 may deliver, using the established secure tunnel, a bootloader and a workload to the Measured VM 342 for execution.

With reference to element 19, once the bootloader is delivered and the Measured VM 342 is ready to boot, the Measured VM 342 may notify the virtualization platform 334 about handing over control to the delivered bootloader. Measured VM 342 may then start executing instructions specified in the bootloader. After the Measured VM 342 boots, the virtualization platform 334 may release the TPM 344 so that is it no longer exclusive to this Measured VM 342, instructing the TPM 344 to reset all the PCR registers that are populated with values specific to this Measured VM 342. From this time forward, the TPM and the virtualization platform 334 may be used to start and attest to another Measured VM. Release of the TPM may be related to the TPM being physically-based and not virtual. If the TPM is virtual, releases might not be required.

Since there are many Measured VMs 342A-C and the TPM 344 is not virtualized, the creation of Measured VMs may be serialized until authenticity of the virtualization platform 334 is confirmed or denied. When Measured VM creation with VM BIOS set to secure boot is initialized, no other such VM may use TPM 344 or be created until the TPM quote for this Measured VM is obtained to ensure that the TPM is in a known state (e.g., VM related TPM resources are exclusively allocated to this Measured VM). Once VM creation is complete (e.g., the boot loader is delivered), the PCR storing measurements of a particular VM state can be reset, the TPM may be released, and a next Measured VM requiring secure booting may be created. To ensure that a malicious boot server or technical difficulties do not prevent permanent block on creation of VMs with secure boot, a configurable timer may be used. If the time expires before the Measured VM 342, virtualization platform 334, and infrastructure 338 have been authenticated, cloud orchestrator 318 may determine that the virtualization platform 334 is not authentic and abort the boot request.

As such, the example embodiments provide for using a PXE boot mechanism as an communication channel between a virtualization platform 334 and a tenant for attestation of the virtualization platform 334. Further, inclusion of a secure tunnel measurement as part of measurements of the virtualization platform may solve the problem of associating particular physical infrastructure 338 to a specific TPM 344 to protect against Man-in-the-Middle and Relay attacks. This approach may also provide a novel approach to the issue of limited TPM resources and support multiple tenants by not requiring virtualization of the TPM. The virtualization platform 334 may be the only element that needs access to the TPM 344 and may use the TPM efficiently by sequentializing the creation of Measured VMs.

The example embodiments further provide protection against introduction of public keys of a rogue TPM (e.g., valid non-tampered TPM belonging to a platform owned by an attacker). A TPM may provide anonymity and the keys presented by the TPM cannot be directly tied to physical infrastructure that contains the TPM. The risks introduced by this design are mitigated by two factors. As discussed herein, the cloud provider may maintain a listing of valid AIK keys and their corresponding physical infrastructure in a key inventory which is shared with the tenant. To introduce a rogue TPM to the physical infrastructure 338, an attacker may have to physically interconnect the rogue TPM with the platform physical infrastructure 338, and introduce keys belonging to the rogue TPM to the key inventory maintained by the cloud provider.

The second mitigating factor is based on the measurements of software and configuration information. Even if such rogue TPM (but otherwise valid, not tampered with, correctly functioning) TPM is introduced to the physical infrastructure 338, a tenant may refuse to use the physical infrastructure unless it runs authentic, not tampered with, and correctly configured software. A correctly functioning TPM is expected to provide measurements that can be trusted. Measurements would either prove that the physical infrastructure 338 incorporating a rogue TPM runs authentic correctly configured software (and therefore the rogue TPM most likely has not been included in the inventory provided to the tenant) or is running modified or misconfigured software. The rogue TPM therefore would fail authentication either by not being included in the inventory, or by running modified or misconfigured software.

Migration

In an example embodiment, the Measured VM 342 might be prevented from migrating to different physical structure than the physical infrastructure 338 on which the Measured VM is running. As noted above, a specific TPM integrated in the physical infrastructure 338 running a virtualization platform 334 that created the Measured VM may attest to the authenticity of the Measured VM. Because attestation of the Measured VM is tied to a specific TPM, the Measured VM might be prevented from migrating to different physical infrastructure. This is because a measurement of the different physical infrastructure would differ from a measurement of the physical infrastructure 338.

Further, a Measured VM may only be attested to a single time during a PXE boot sequence (e.g., before tenant's workload is delivered to the Measured VM). Because there might not be a follow up attestation once the Measured VM is running, the virtualization platform 334 and physical infrastructure 338 hosting the Measured VM might not be permitted to change at all. For example, the following might not be permitted to change: any binaries, configuration, loadable modules, firmware, certificates, and the like. To change any of the elements of the virtualization platform used to run the Measured VM, the Measured VM on that platform may have to be shutdown prior to making any change to the virtualization platform. Otherwise, authentication of the Measured VM may be revoked.

Software

The software operating in the cloud environment may be grouped into three main categories. The first category may include software providing the virtualization platform 334 used to run workloads in the cloud. This software may be supplied by a software vendor independent from the cloud provider; and may be deployed, reviewed and tested independently from the cloud environment. The second category may include software providing and managing the access to the cloud environment, mainly to the virtualization platform 334 and resources on which the platform 334 runs. Software in the second category may be supplied and developed internally by the cloud provider, may be proprietary, and might not be available for examination outside of the cloud environment. The third category may include software deployed by tenants to run as a workload on the cloud.

Protection against software based attacks may be based on any modification to the software used to execute a workload. Such modifications may be manifested in measurements of the software, and the modifications may be detected outside of the cloud environment by measuring of the virtualization platform 334 by the tenant. The expected measurements for a trusted virtualization platform can be established during such in house testing. If an attacker either modifies the software or includes unauthorized software as part of the virtualization platform (e.g., as a loadable module, measured by its trusted loader), a measurement representing the platforms will differ from an expected measurement. The remote attestation protocol discussed herein may deliver these invalid measurements as part of the TPM quote and tenant's Secure/Trusted boot server 330 may prevent use of such altered virtualization platform.

Configuration

The configuration parameters used by the virtualization platform 334 may have an impact on security. Each Measured VM is configured to verify the authenticity of a certificate presented by the Secure/Trusted boot server 330 against a preconfigured certificate/certificate authority. In addition, each Measured VM is configured with specific network address (e.g., URL) at which it should contact the Secure/Trusted boot server 330.

Additional parameters specific to the virtualization platform 334 (e.g., list of loadable modules) may have security implications as well. For instance, an attack based on configuration information might be based on changing configuration information to let the virtualization platform 334 connect to an impostor rather than to an expected tenant. The example embodiments may provide protection against a configuration-based attack similar to how protection is provided against a software-based attack. Configuration information may affect trustworthiness, and security parameters may be included in measurements used for attestation of authenticity of the virtualization platform 334. Once measurements have been received from the TPM, the tenant may determine measurements of a configuration of the virtualization platform 334 match an expected configuration, in the manner provided above, to determine whether to authenticate the platform 334. Network One way to access resources provided by the cloud platform is over a computer network. Lack of physical access to the platform physical infrastructure 338 represents a significant challenge for a tenant to establish trust in a virtualization platform 334. To execute an attack over the network, an intruder may have to first gain access to the network. Several approaches described herein limit unauthorized access to the network between the tenant and the platform physical infrastructure:

First, the cloud provider and the tenant may deploy a network access control mechanism (e.g., based on an IEEE 802.1X standard) where each device connecting to the network may be authenticated (e.g., using a digital certificate issued by the network owner). Second, the tenant may operate within the cloud environment on a dedicated VLAN. Third, a tenant's internal as well as the virtual environments are protected by physical and virtual firewall. Since a tenant controls what resources are active within the cloud environment at any given moment, dynamically modified firewall rules can tightly control exactly what devices (e.g., IP addresses, MAC addresses) may communicate at any given moment and how (e.g., protocol). Lastly, the tenant and the cloud provider may use a private encrypted connection (e.g., private circuit, site-to-site VPN) with strict filtering and authentication rules to cross connects the tenant data center 302 and the cloud provider data center 304.

If the intruder still manages get access to the cloud provider data center 304, two additional mechanisms may be used to protect communication between the tenant and the cloud infrastructure 310 when establishing trust in the virtualization platform 334.

A first type of attack that the example embodiments may protected against is referred to as a Man in the Middle attack. The Man in the Middle attack may be an attack in which an intruder eavesdrops and/or tampers with communication between two parties. Rather than communicating with each other directly, each of the two parties unknowingly communicates with the intruder, which controls the connections and relays the messages between the communicating parties.

To execute a Man in the Middle attack on the above embodiments, the intruder would have to eavesdrop and control the connection between the Secure/Trusted boot server 330 and the Measured VM 342. The example embodiments protect against such an attack by using a secure tunnel (e.g., TLS) between the communicating parties, where the channel is established after certificates of the communicating parties have been validated. Executing a Man in the Middle attack on a TLS protected connection used for online commerce is highly unlikely. In addition, the example embodiments may utilize another encrypted tunnel (e.g., TPM transport session) within the secure tunnel established using TLS protocol. The inner encrypted tunnel may be established using a TPM transport session mechanism and is established directly between the Secure/Trusted boot server 330 and the TPM 344 executing the commands used to produce the TPM quote.

A second type of attack that the example embodiments may protect against is referred to as a Relay attack. A Relay attack is attack in which intruder poses as a valid cloud provider system potentially by relaying responses from a valid cloud provider system. A Relay attack can be viewed as special type of MiM attack. To execute a relay attack on the example embodiments, an intruder would have to relay the results provided by the valid virtualization platform 334 to the Secure/Trusted boot server 330 to make the Secure/Trusted boot server release the tenant's bootloader code to the intruder. The example embodiments may protect against this type of attack by using the two mechanisms already mentioned in the discussion on MiM attacks. Further, by making measurements of the outer secure tunnel (e.g., TLS) between the Secure/Trusted boot server 330 and the Measured VM 342 part of the measurements of the Measured VM, the example embodiments may verify that the cloud endpoint of the secure tunnel (e.g., the virtualization platform physical infrastructure 338) does in fact incorporate the TPM 344.

A second type of attack that the example embodiments may protect against is referred to as a Combined attack. A Combined attack may include a combination of the network attack and the configuration-based attack, discussed above. To execute a Combined attack, an intruder would have to modify, tamper with, or misconfigure software of the virtualization platform 334. Modification of code or configuration of the virtualization platform 334 would be detectable by the tenant since the modification would be present within the TPM quote. Correct measurements may be obtained only on unmodified and correctly configured virtualization platform 334 that would not communicate with the intruder.

Figure 7:
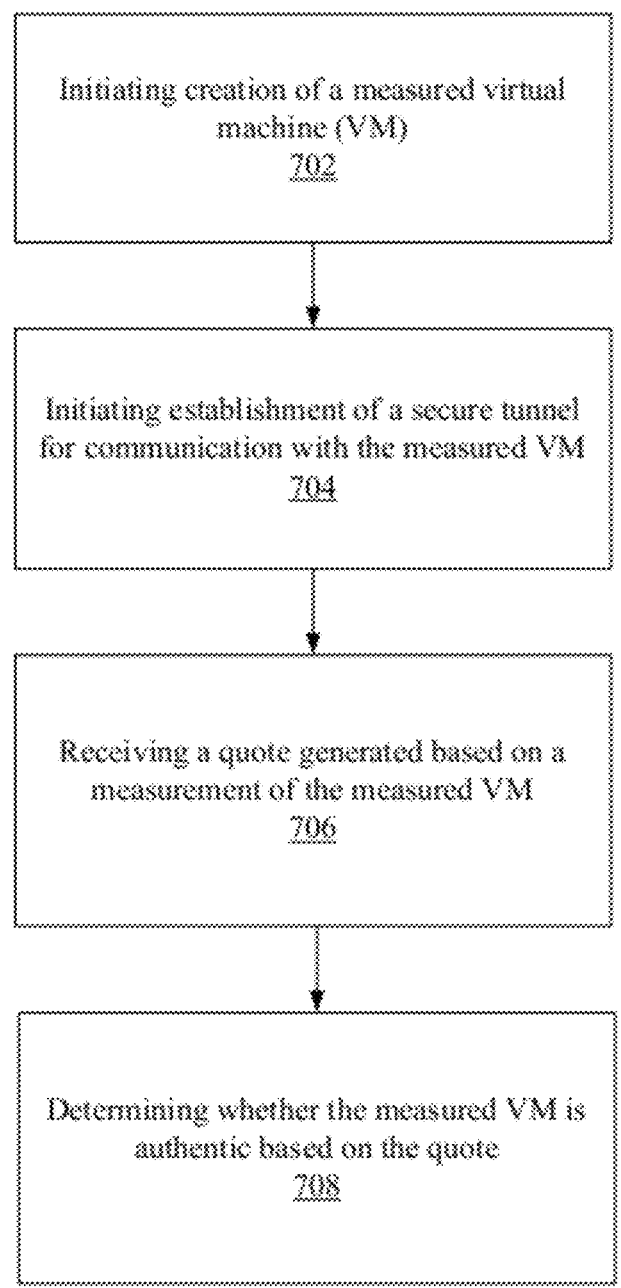
FIG. 7 illustrates an example flow diagram of a method for determining authenticity of a measured virtual machine (VM), in accordance with example embodiments.

FIG. 7 illustrates an example flow diagram of a method for determining authenticity of a measured VM, in accordance with example embodiments. The method may be performed by a single apparatus such as, for example, a computer, server, or other computational device. For example, the method may be implemented by a single apparatus (e.g., computer) performing the functions of the cloud orchestrator 318, boot server 330, and internal database 322, discussed above. The order of the blocks shown in FIG. 7 is an example. The blocks may be arranged in other orders, each a function described in each block may be performed one or more times, some blocks may be omitted, and/or additional blocks may be added. The method may begin at block 702.

In block 702, the method may include initiating creation of a Measured VM. For example, cloud orchestrator 318 may initiate creation of a Measured VM 342, as described above in elements 1-2 of FIG. 6.

In block 704, the method may include initiating establishment of a secure tunnel for communication with the measured VM. For example, the cloud DMZ 306, including the cloud orchestrator 318 and the boot server 330, may establish a secure tunnel with the Measured VM 342, as described above in elements 6-9 of FIG. 6.

In block 706, the method may include receiving a quote generated based on a measurement of the Measured VM. For example, the cloud DMZ 306, including the cloud orchestrator 318 and the boot server 330, may receive a TPM quote from the Measured VM, as described above in element 15 of FIG. 6.

In block 708, the method may include determining whether the Measured VM is authentic based on the quote. For example, the cloud DMZ 306, including the cloud orchestrator 318 and the boot server 330, may process a TPM quote to determine whether Measured VM 342 is authentic, as described above in elements 16-17 of FIG. 6. The method may end, or may return to any of the preceding steps.

Figure 8:
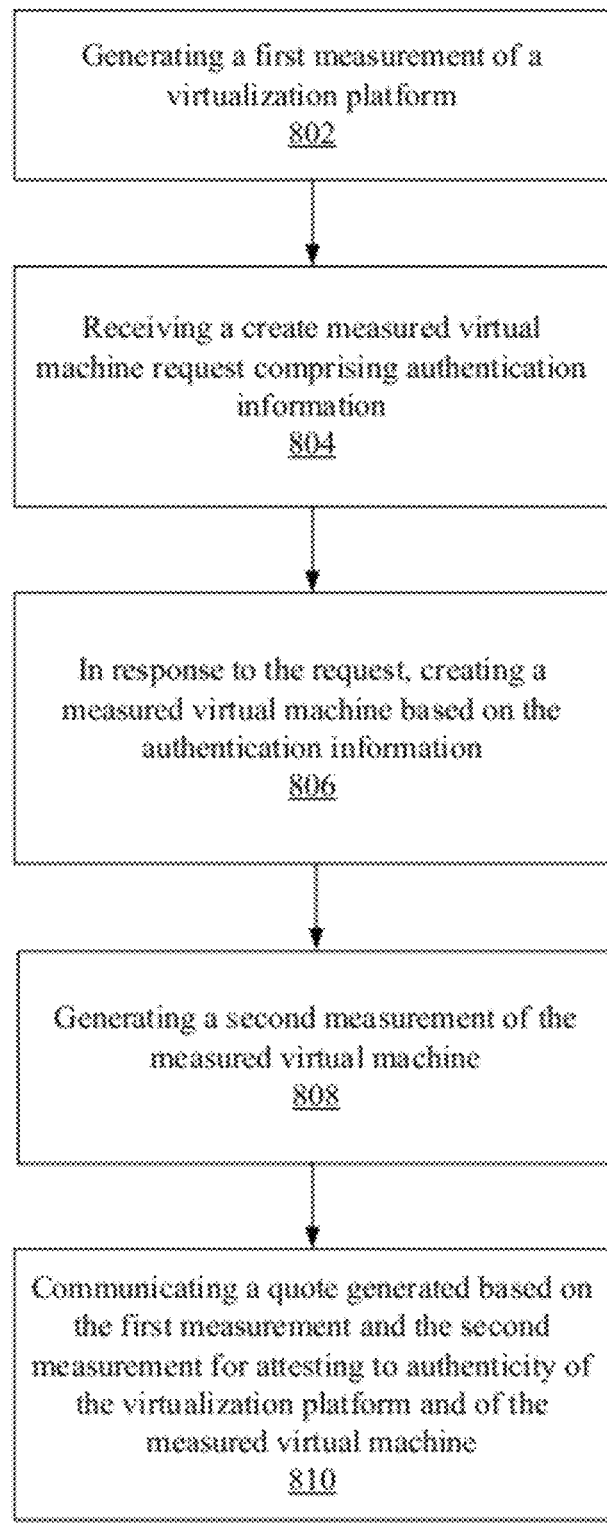
FIG. 8 illustrates an example flow diagram of a method for measuring a virtualization platform and a Measured VM in a cloud computing environment, in accordance with example embodiments.

FIG. 8 illustrates an example flow diagram of a method for measuring a virtualization platform and a Measured VM in a cloud computing environment, in accordance with example embodiments. The method may be implemented by a single apparatus such as, for example, a computer, server, or other computational device. For example, a single apparatus (e.g., computer) may perform the functions of the cloud platform 332, the virtualization platform 334, and the virtualization platform physical infrastructure 338. The order of the blocks shown in FIG. 8 is an example. The blocks may be arranged in other orders, each a function described in each block may be performed one or more times, some blocks may be omitted, and/or additional blocks may be added. The method may begin at block 802.

In block 802, the method may include generating a first measurement of a virtualization platform. For example, the virtualization platform 334 may store various measurements values in a TPM 344, as described above in element 0 of FIG. 6.

In block 804, the method may include receiving a create measured virtual machine request comprising authentication information. For example, the virtualization platform 334 may receive a request, which includes an authentication code U, to create a Measured VM 342, as described above in elements 2-4 of FIG. 6.

In block 806, the method may include, in response to the request, creating a measured virtual machine based on the authentication information. For example, the virtualization platform 334 may create a Measured VM 342 based on the authentication code U, as described above in element 5 of FIG. 6.

In block 808, the method may include generating a second measurement of the measured virtual machine. For example, the virtualization platform 334 may generate measurement values based on measuring the Measured VM 342, as described above in element 4 of FIG. 6.

In block 810, the method may include communicating a quote generated based on the first measurement and the second measurement for attesting to authenticity of the virtualization platform and of the measured virtual machine. For example, virtualization platform 334 may instruct the TPM 344 to generate a TPM quote based on one or more measurements stored in the PCRs, and may cause the TPM 344 and Measured VM 342 to deliver the TPM quote to the boot server 330, as discussed in elements 14-15 of FIG. 6. The TPM quote may be used for attesting to integrity and authenticity of the virtualization platform 334, of the Measured VM 342, and optionally of the physical infrastructure 338. The method may end, or may return to any of the preceding steps.

Figure 9:
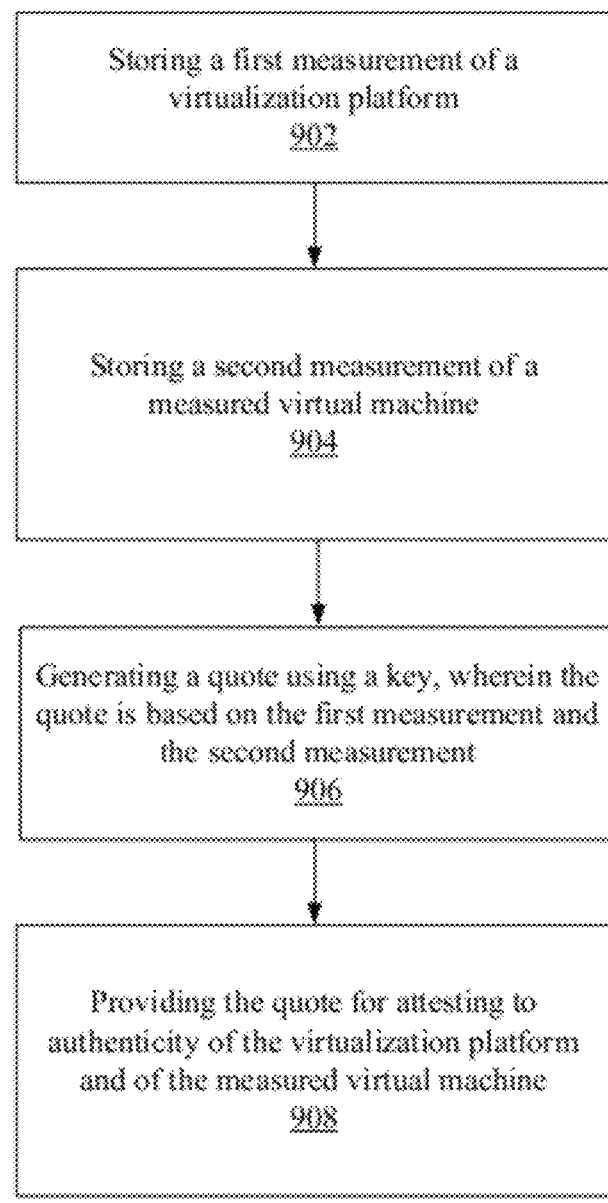
FIG. 9 illustrates an example flow diagram of a method for providing a quote for attesting to integrity and authenticity of a virtualization platform and of a measured virtual machine, in accordance with example embodiments.

FIG. 9 illustrates an example flow diagram of a method for providing a quote for attesting to integrity and authenticity of a virtualization platform and of a measured virtual machine, in accordance with example embodiments. The method may be implemented by a single apparatus such as, for example, a computer, server, or other computational device. For example, a single apparatus (e.g., computer) may perform the functions of the TPM 344. The order of the blocks shown in FIG. 9 is an example. The blocks may be arranged in other orders, each function described in each block may be performed one or more times, some blocks may be omitted, and/or additional blocks may be added. The method may begin at block 902.

In block 902, the method may include storing, by trusted hardware, a first measurement of a virtualization platform. For example, virtualization platform 334 may communicate one or more measurement values of platform 334 to the TPM 344 for storage in one or more PCRs, as described above in element 0 of FIG. 6. In a further example, the first measurement of the virtualization platform may be of at least one of physical hardware, low level software (e.g., BIOS, boot loader, and the like), tenant independent platform binaries and configuration.

In block 904, the method may include storing a second measurement of a measured virtual machine. For example, virtualization platform 334 may make and communicate one or more measurement values of a Measured VM 342 to the TPM 344 for storage, as described above with reference to element 4 of FIG. 6. The second measurement of the virtualization platform may include, for example, a measurement of at least one of a binary, configuration information, a cryptographic key, a digital certificate, a driver, a module, as well as of other information. In a further example, the second measurement may be of tenant dependent platform binaries and configuration. TPM 344 may also store additional measurements, such as, for example, a third measurement of a secure tunnel (e.g., a measurement of a symmetric encryption key used by TLS). In a further example, the third measurement may also serve as the nonce.

In block 906, the method may include generating a quote using a key, wherein the quote is based on the first measurement and the second measurement. For example, the TPM 344 may generate a TPM quote, as described above with reference to element 14 of FIG. 6. In a further example, TPM 344 may generate the quote based on the third measurement of a secure tunnel.

In block 910, the method may include providing the quote for attesting to authenticity of the virtualization platform and of the measured virtual machine. For example, the TPM 344 may generate provide a TPM quote to the Measured VM 342 that delivers the quote to the boot server 330, as described above with reference to element 15 of FIG. 6. The method may end, or may return to any of the preceding steps.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

The invention claimed is:

1. An apparatus comprising:
   at least one processor; and
   at least one memory storing computer executable instructions that, when executed by the at least one processor, cause the apparatus at least to:
   initiate creation of a measured virtual machine (VM) associated with a virtualization platform provided by a cloud provider;

initiate establishment of a secure tunnel for communication with the measured VM;

receive a quote generated by a trusted protection module (TPM) included in physical infrastructure associated with the virtualization platform, the quote being generated based on a measurement of the measured VM, wherein the quote is uniquely tied to hardware included in the physical infrastructure, and the cloud provider creates an association between the TPM and the quote for confirming authenticity of the physical infrastructure associated with the virtualization platform; and determine whether the measured VM is authentic based on the quote and the association between the TPM and the quote created by the cloud provider.

2. The apparatus of claim 1, wherein the initiating creation of the measured VM further comprises:

generating a reservation comprising authentication information and a network address.

3. The apparatus of claim 2, wherein the initiating establishment of the secure tunnel is in response to receiving a boot request comprising the authentication information and the network address.

4. The apparatus of claim 1, wherein the quote comprises a key of the TPM and a measurement.

5. The apparatus of claim 4, wherein the executable instructions, when executed, further cause the apparatus to:

verify that the key corresponds to an expected key of the TPM and that the measurement corresponds to an expected measurement; and in response to the verifying, determining that the measured VM is authentic and causing delivery of a bootloader to the measured VM for execution of a computational workload.

6. The apparatus of claim 1, wherein the quote is based on at least one of a measurement of the secure tunnel, a measurement of a virtualization platform, a measurement of configuration information, and a measurement of the physical infrastructure on which the virtualization platform runs.

7. The apparatus of claim 1, wherein the initiating establishment of the secure tunnel further comprises establishing a transport session within the secure tunnel.

8. A method comprising:

generating and communicating, by a computing device, a create measured virtual machine (VM) request to initiate creation of a measured VM associated with a virtualization platform provided by a cloud provider, the request comprising a network address of a boot server;

initiating, by the computing device, establishment of a secure tunnel with the measured VM;

receiving, by the computing device, and from the measured VM, a quote generated by a trusted protection module (TPM) included in physical infrastructure associated with the virtualization platform, the quote being generated based on a measurement of the measured VM, wherein the quote is uniquely tied to hardware included in the physical infrastructure, and the cloud provider creates an association between the TPM and the quote for confirming authenticity of the physical infrastructure associated with the virtualization platform; and determining, by the computing device, whether the measured VM is authentic based on the quote and the association between the TPM and the quote created by the cloud provider.

9. The method of claim 8, wherein the create measured VM request comprises authentication information and a network address.

10. The method of claim 9, wherein the initiating establishment of the secure tunnel is in response to receiving a boot request comprising the authentication information and the network address.

11. The method of claim 8, wherein the quote comprises a key of the TPM and a measurement.

12. The method of claim 11, further comprising:

verifying, by the computing device, that the key corresponds to an expected key of the TPM and that the measurement corresponds to an expected measurement; and in response to the verifying, determining, by the computing device, that the measured VM is authentic and causing delivery of a bootloader to the measured VM for execution of a computational workload.

13. The method of claim 8, wherein the quote is based on at least one of a measurement of the secure tunnel, a measurement of a virtualization platform, a measurement of configuration information, and a measurement of the physical infrastructure on which the virtualization platform runs.

14. The method of claim 8, wherein the initiating establishment of the secure tunnel further comprises establishing a transport session within the secure tunnel.

15. A non-transitory computer-readable medium storing computer-executable instructions that, when executed, cause a computing device to:

generate and communicate a create measured virtual machine (VM) request to initiate creation of a measured VM associated with a virtualization platform provided by a cloud provider;

initiate establishment of a secure tunnel with the measured VM;

receive, from the measured VM, a quote generated by a trusted protection module (TPM) included in physical infrastructure associated with the virtualization platform, the quote being generated based on a measurement of the measured VM, wherein the quote is uniquely tied to hardware included in the physical infrastructure, and the cloud provider creates an association between the TPM and the quote for confirming authenticity of the physical infrastructure associated with the virtualization platform; and determine whether the measured VM is authentic based on the quote and the association between the TPM and the quote created by the cloud provider.

16. The computer-readable medium of claim 15, wherein the create measured VM request comprises authentication information and a network address.

17. The computer-readable medium of claim 16, wherein the initiating establishment of the secure tunnel is in response to receiving a boot request comprising the authentication information and the network address.

18. The computer-readable medium of claim 15, wherein the quote comprises a key of the TPM and a measurement.

19. The computer-readable medium of claim 18, storing additional computer-executable instructions that, when executed, further cause the computing device to:

verify that the key corresponds to an expected key of the TPM and that the measurement corresponds to an expected measurement; and in response to the verifying, determining that the measured VM is authentic and causing delivery of a bootloader to the measured VM for execution of a computational workload.

20. The computer-readable medium of claim 15, wherein the quote is based on at least one of a measurement of the secure tunnel, a measurement of a virtualization platform, a measurement of configuration information, and a measurement of the physical infrastructure on which the virtualization platform runs.

21. The method of claim 8, wherein the association between the TPM and the quote is maintained in an inventory of valid attestation identity keys (AIKs).

22. The method of claim 21, wherein the cloud provider provides the inventory of valid AIKs to at least one tenant to enable remote attestation of authenticity of a cloud infrastructure providing the measured VM.

23. The method of claim 22, wherein the inventory of valid AIKs identifies at least one specific physical infrastructure that contains a specific TPM having a specific AIK public key.

24. The method of claim 21, wherein the cloud provider creates the association between the TPM and the quote in accordance with a legal agreement between at least one tenant and the cloud provider.

\* \* \* \* \*